United States Patent [19]

Bryant

[11] 4,350,459
[45] Sep. 21, 1982

[54] STRUCTURAL MEMBERS

[76] Inventor: Peter E. Bryant, 10788 La Batista, Fountain Valley, Calif. 94708

[21] Appl. No.: 234,366

[22] Filed: Feb. 13, 1981

[51] Int. Cl.³ .......................... B25G 3/00; F16B 9/00; F16L 41/00
[52] U.S. Cl. ...................................... 403/263; 52/282
[58] Field of Search ................ 52/241, 282, 732, 665; 403/244, 263, 403, 404, 347

[56] References Cited

U.S. PATENT DOCUMENTS

| 3,327,438 | 6/1967 | Cooper | 52/241 X |
| 3,487,598 | 1/1970 | Lopina | 52/241 X |
| 3,623,290 | 11/1971 | Downing | 52/241 X |
| 3,820,299 | 6/1974 | Verholt | 52/282 |
| 4,041,667 | 8/1977 | Lindner et al. | 52/241 X |
| 4,251,964 | 2/1981 | Francis | 52/282 |

*Primary Examiner*—Wayne L. Shedd
*Attorney, Agent, or Firm*—Robert R. Finch

[57] ABSTRACT

There is disclosed an elongated extruded beam having three parallel channels including a center channel and two side channels facing outwardly at a right angle to the center channel. The sidewalls of the center channel form the bases of the side channels, and the inside width of the center channel is greater than the thickness of the beam. There is also provided a separate clip having a base and a rectangular leg normal thereto, both the base and rectangular leg are of width to be received in all channels and the leg is of length to extend above the channel sidewalls. If desired, one of the outward facing channels may be omitted from the beam.

6 Claims, 7 Drawing Figures

STRUCTURAL MEMBERS

FIELD AND BACKGROUND OF THE INVENTION

This invention relates to structural stringers or beams adapted to form the structural frame of truck, bus or motorhome bodies and the like. More particularly, it is directed to a unique design extruded beam whereby two or more beams can be easily assembled to form a strong framework.

Metal frames for truck, bus or motorhome bodies are in common use. Most frequently such frames are built up from angles, box beams or other stringers fastened together in a variety of ways, such as rivets, bolts and/or welding. Although such structures are usually sound, assembly is difficult, an inventory of several different parts comprising the assembly is usually required, and several techniques such as cutting, drilling and/or welding are often required to complete the job. These problems are compounded by the fact that the available beams are not close tolerance members hence much time is wasted in cutting, fitting and adjusting.

Some close tolerance extruded members have been made available for special purposes such as assembling frames for windows, porches or furniture. A typical assembly of this type is disclosed in U.S. Pat. No. 3,848,387 wherein two separate extrusions of different designs are provided. One extrusion has a pair of longitudinal flanges of depth and spacing to fit into a complemental pair of flanges of different spacing and depth on the other extrusion.

The prior arrangement is useful for joining beams together in parallel longitudinal relationship or in angular relationship at their ends to form corners. However, they do not permit assembly of similar members transverse to each other intermediate the ends thus they have limited versatility. Also, since the disclosed extrusions cannot be identical, an inventory of both types is required.

SUMMARY OF THE INVENTION

It is the primary object of this invention to provide an extruded beam of design such that two or more of such beams can be assembled to each other in a variety of ways, either adjacent to or intermediate the ends, and in either parallel or angular relationship.

It is another object to provide a beam of design such that two of beams may be joined in planes normal to each other without the use of any other joining elements.

A further object is to provide, in combination with the elongated extruded beam, a joint member of clip enabling the simple assembly of the beams in edge to edge relationship.

The foregoing and probably other objects are achieved by the provision of a beam which in its preferred form comprises three parallel channels including a first or center channel and two laterally outwardly facing second or side channels positioned at right angles to the center channel. Each channel has opposed sidewalls of equal height; and the sidewalls of the center channel form the bases of the two outward facing side channels. The inside width of the center channel is slightly greater than the thickness of the beam. With this arrangement, two of the beams may be fitted together in normal relationship with their long axis in either parallel or angular relationship simply by inserting one member edgewise (end or side edge) into the center channel. When so assembled the parts may be joined together by rivets or other fasteners.

To enable joining beams together in the same plane along the open side of an outward facing side channel, a simple joint member is provided. For convenience, this is referred to as a clip. The clip has a base and a generally rectangular leg extending transversely therefrom. The width of the base and leg is selected to be received in the side channels while the length of the leg is sufficient so that when the clip is in a channel, the leg will extend out of the channel. The other dimension of the leg, is slightly less than the inside width of the center channel whereby the clip may have its base secured to the bottom of any channel of one beam and the upstanding or transverse leg secured to the sidewalls of the center channel of another beam. The clip and the beams are secured by any suitable fasteners.

In accordance with the invention the beams are designed to be extruded to precise size. Also, the clip is designed to be extruded in lengths, then sliced to proper size.

In a modification of the invention useful under special conditions, one of the side channels is omitted and the beam is formed with only two channels, however, the dimensional relationships of the two channels is the same as exists between a side channel and the center channel of the previously described three channel beam. Also, a clip is used in the same manner as in the three channel configuration.

In order that the invention may be more readily understood and carried to effect, reference is made to the accompanying drawings and description thereof which are offered by way of illustration and not in limitation of the invention, the scope of which is defined by the appended claims, including equivalents thereof, rather than by any preceding description.

DETAILED DESCRIPTION OF THE DRAWINGS

Figure 1:
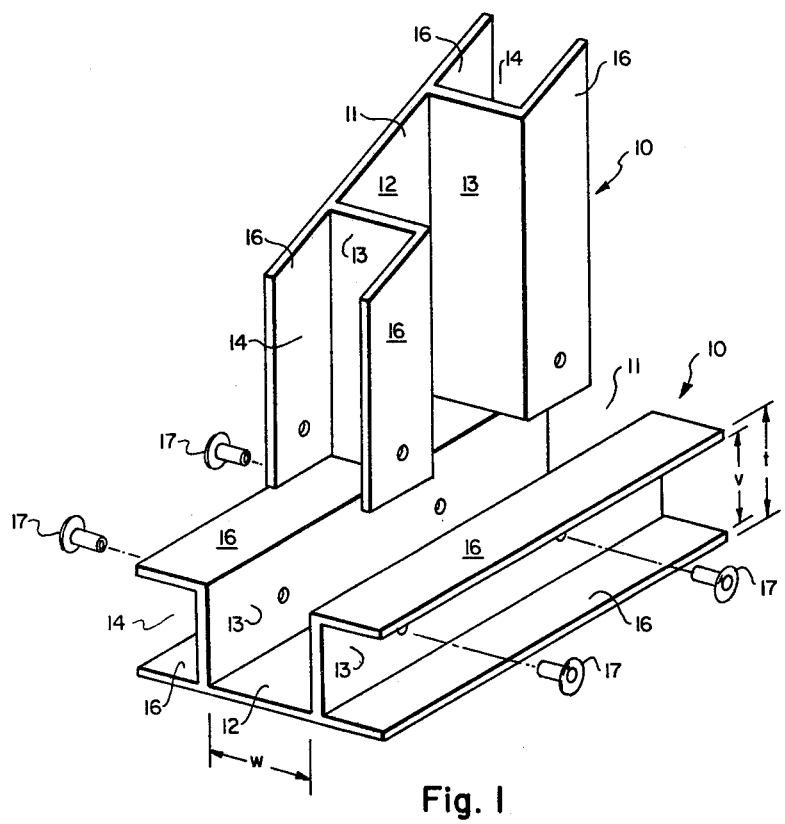
FIG. 1 is an exploded perspective view illustrating how one beam may be fitted edgewise into the center channel of another piece of the same beam.

As shown in the drawings, the basic beam comprises an elongated rigid extrusion 10 formed as three integral channels including a first or center channel 11 defined by a base 12 and spaced apart parallel sidewalls 13 of equal height; and two second or side channels 14 facing laterally outwardly at 90° from opposite sides of the center channel 11. The outward facing side channels 14 are defined by the sidewalls 13 of the center channel (which form the bases of the side channels) and by parallel equal height sidewalls 16 extending laterally from the top and bottom of the sidewalls 13 of the center channel. One wall 16 of each side channel is in the same plane as the base 12 of the center channel while the other walls 16 extend from the top edge a sidewall 13 of the center channel. The outside dimension of the side channels is equal to the height of the center channel sidewalls and defines the depth or thickness of the beam.

Figure 2:
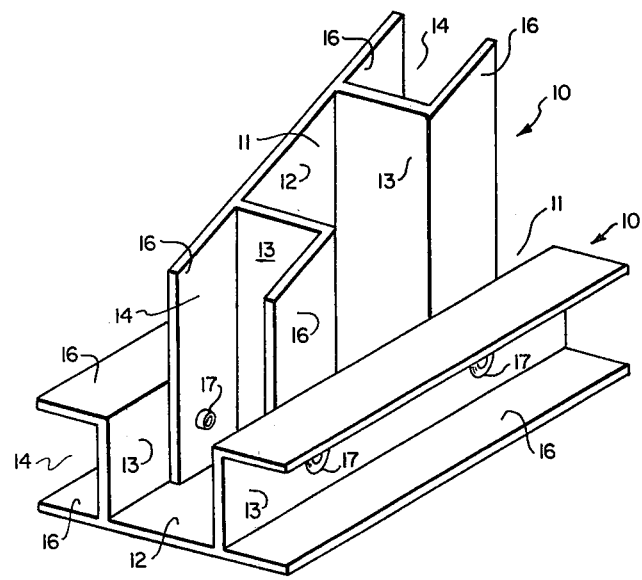
FIG. 2 is a perspective view showing the beams of FIG. 1 fully assembled and secured.
Figure 3:
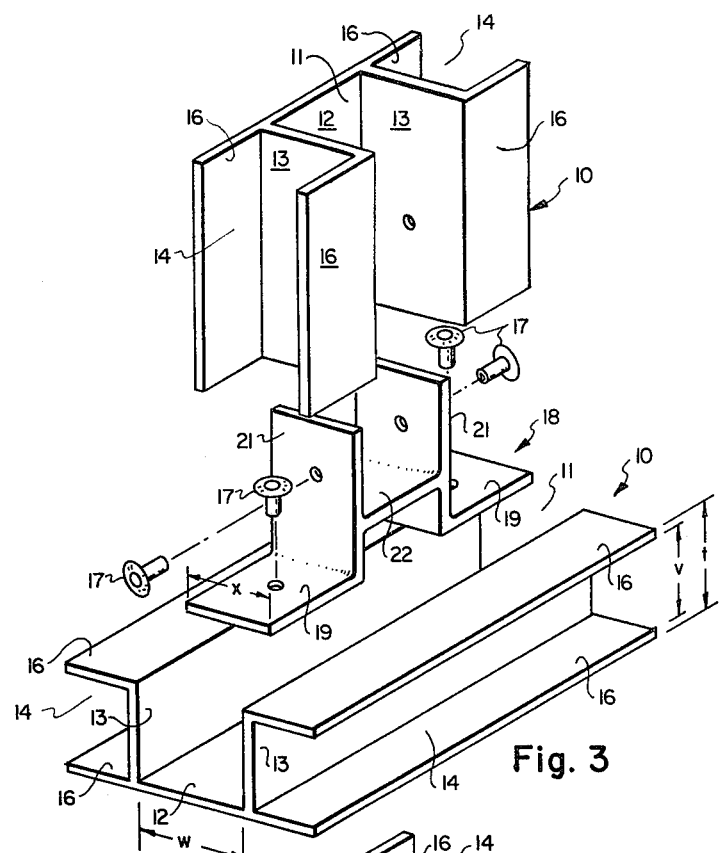
FIG. 3 is an exploded view of an assembly or joint similar to FIGS. 1 and 2, but with the addition of a joint clip.

Referring especially to FIGS. 1 and 3, it will seem that the inside width, w, of the center channel is just enough greater than the thickness, t, of the beam to enable two beams to be assembled together by inserting one edgewise into the center channel of the other as shown in FIGS. 1–3. When so assembled, the parts may be joined together by any suitable fasteners such as rivets 17. Obviously, the angular relationship between two beams 10 may vary from perpendicular to parallel. If a transverse angle less than 90° is desired it will be advantageous to make an angular cut across the end of the beam to be inserted as shown in FIGS. 1 and 2 to maximize overlap and thus the strength of the joint. In such a case, if the angled end is inserted in a center channel, the beam will extend at an angle.

As a feature of the invention, a clip or joint-forming member 18 is provided. This clip comprises a base 19 and a transversely extending generally rectangular leg 21 both of which are sized to be received in all channels. Thus, the width, x, of the clip base 19 is less than either inside width, w, of the center channel or inside width v, of the side channels. The other dimension of the leg is selected so that it can be received in the center channel 11 with the outside walls of the leg in face-to-face relationship with the inside channel walls. The leg 21 is long enough to extend a significant distance out of a channel when the clip base is secured therein thus to provide a substantial overlap whereby to insure a strong joint when the parts are secured together by suitable fasteners 17.

As illustrated in FIG. 3, the clip 18 is shown with spaced apart legs 21 with a spacer web 22 therebetween. When this construction is used, the web 22 is spaced above the base 19 at about the height of the top of the channel sidewalls 16 to maximize strength at the joint. If desired, the clip 18 can be provided with a solid leg. In such a case the connection in the channel would be by a through bolt rather than rivets.

Figure 4:
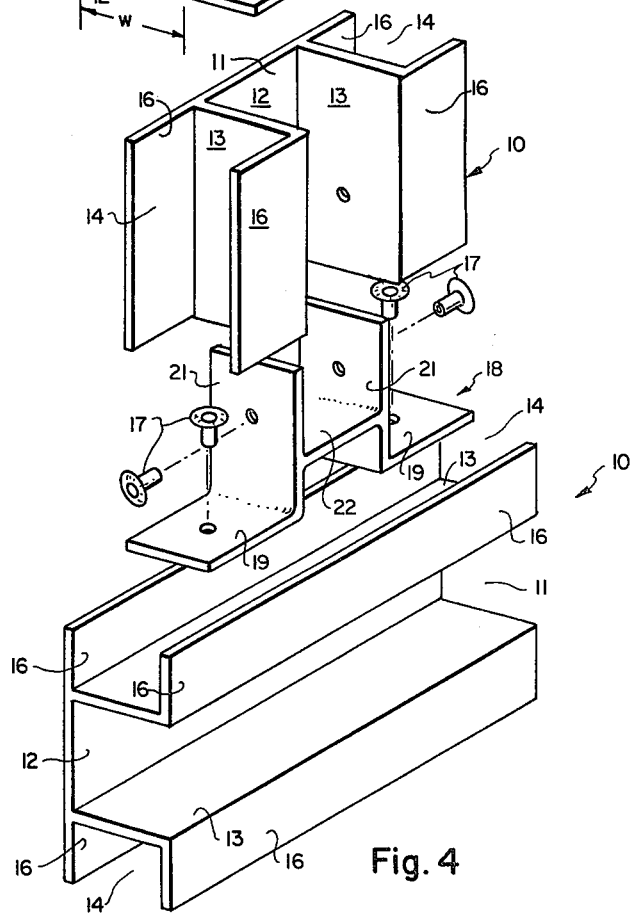
FIG. 4 is an exploded perspective view of an assembly in which two beams are fitted together edge to edge by the use of a joint forming member or clip.

As best shown in FIG. 4, edge-to-edge joining of two beams in the same plane is accomplished by securing the base 19 of a clip 18 in the bottom of a side channel 14 on one beam then fitting the center channel 11 of the other beam over the leg and securing the channel walls 13 thereto If the leg is solid or is otherwise provided with four sides of proper dimension one of the side channels 14 can be fitted over the leg and secured thereto.

Figure 6:
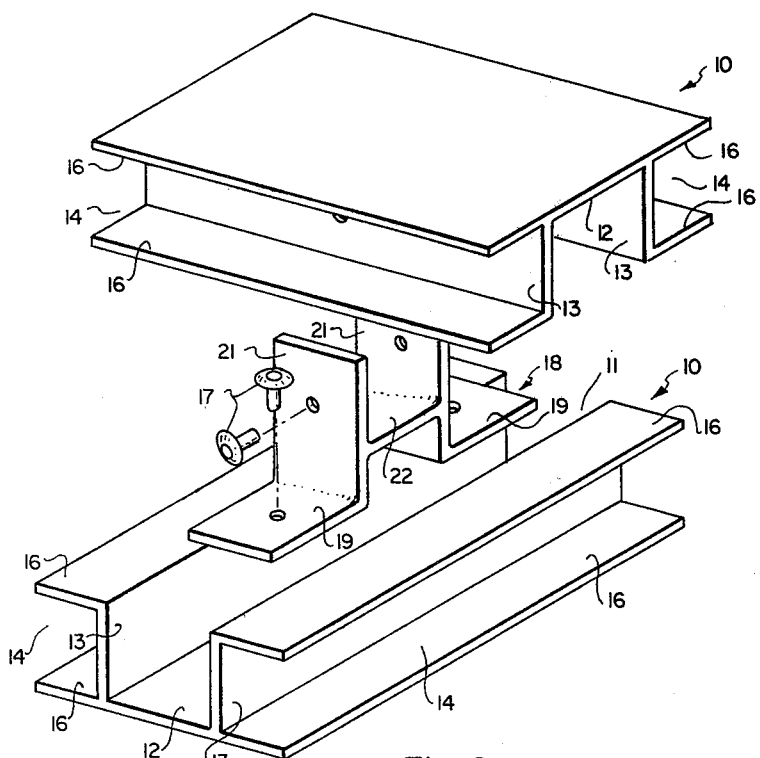
FIG. 6 is an exploded perspective view of a joint comprising two beams arranged in face to face relationship with a clip for securing them together.

Another assembly attainable with the same elements is to position the clip base in the center channel of one beam then insert the leg 21 in the center channel of a trasversely positioned beam 16. This is shown in FIG. 6.

Figure 5:
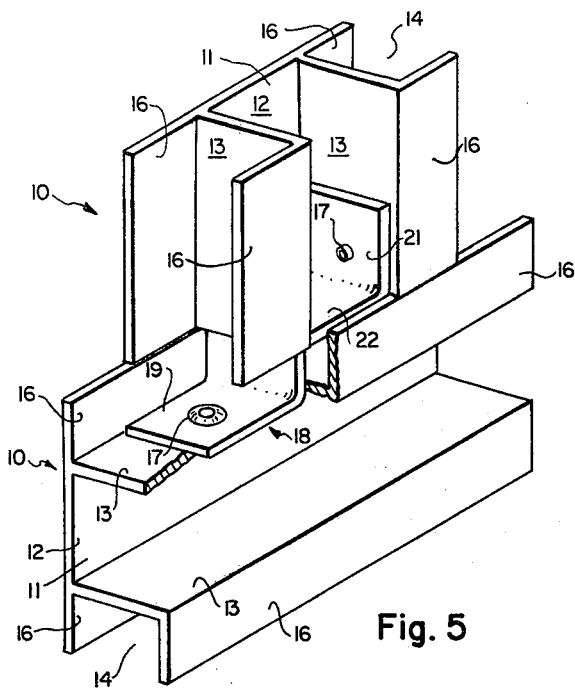
FIG. 5 is a perspective view of the joint of FIG. 4 completely assembled.
Figure 7:
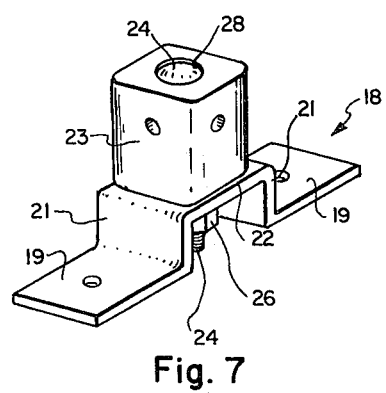
FIG. 7 is a view of a modified form of clip.

The clip 18 can be formed with the transverse leg at any desired angle to the base 19. Also, as shown in FIG. 7, a special design clip may be provided in which the leg 21 is pivotally connected to the base to be rotatable about an axis transverse to the base thus enabling a variety of angular relationships between adjacent beams. For instance, in the configurations illustrated in FIGS. 4–6, the beams may be angled relative to each other. Also, in such a modification the solid leg will be formed as a rectangle with one dimension selected to fit snugly in the center channel and the other to fit snugly in the side channels. In other words, the smaller dimension is less than the inside width of the smaller side channels, while the larger dimension is greater than the width of the side channel but less than that of the center channel. In both cases the appropriate walls of the leg will be in face-to-face relationship with the sidewalls of the channels in which it is received.

Although the invention is described in connection with straight beams, it is equally applicable to curved members. It is also understood that superior results will be obtained if the several dimensions are selected so that parts fit together easily, but with little play; and reference to the several dimensions is entended to refer to such a relationship.

From the foregoing, it is apparent that the design of the beam 10 is unique and enables many combinations. When used with the clip, even more combinations are possible. Thus a kit or system, comprising only one design beam along with a supply of the small clips is capable of forming a variety of economical and reliable framework structures.

I claim:

1. A beam for framework and the like said beam being of the type formed as an elongate rigid member of uniform cross section said beam comprising at least two parallel channels including a first channel defined by a base and spaced apart parallel sidewalls extending from said base normal thereto and a second channel facing outwardly from one sidewall of said first channel, said second channel being defined by a base formed by one sidewall of said first channel and by a pair of spaced apart parallel sidewalls extending from the opposite edges of said base and normal thereto so that the thickness of said beam is defined by the height of the sidewalls of said first channel; and the inside width of said first channel is slightly greater than said thickness of said beam.

2. A beam of the type formed as an elongate rigid member of uniform cross section, said beam comprising three elongate parallel channels including a center channel defined by a base and spaced apart parallel sidewalls extending from said base normal thereto and a pair of side channels facing outwardly from opposite sides of said center channel, each of said side channels being defined by a base formed by a sidewall of said center channel and by a pair of spaced apart parallel sidewalls extending from opposite edges of said base normal thereto so that the thickness of said beam is defined by the height of the sidewalls of said center channel; and the inside width of said center channel is slightly greater than the thickness of said beam.

3. A framework that includes a plurality of elongate beams of uniform cross section said beams comprising three elongate parallel channels including a center channel defined by a base and spaced apart parallel sidewalls extending from said base normal thereto and a pair of side channels facing outwardly from opposite sides of said center channel, each of said side channels being defined by a base formed by one sidewall of said center channels and by a pair of spaced apart parallel sidewalls extending from the opposite edges of said base normal thereto, the thickness of said beam being defined by the height of the sidewalls of said center channel; the inside width of said center channel is slightly greater than the thickness of said beam; and at least two of said identical beams are assembled to each other by means of one of said beams being received edgewise in the center channel of another of said beams and secured therein.

4. A framework comprising a plurality of elongate rigid beams of uniform cross section each beam having three elongate parallel channels including a center channel defined by a base and spaced apart parallel sidewalls extending from said base normal thereto and a pair of side channels facing outwardly from opposite sides of said center channel, each of said side channels being defined by a base formed by a sidewall of said center channel and by a pair of spaced apart parallel sidewalls extending from the opposite edges of said base normal thereto so that the thickness of said beam is defined by the height of the sidewalls of said center channel; said beams being formed with the inside width of said center channel slightly greater than the thickness of said beam; and at least two of said beams are joined together by means of a joint-forming member secured within one of said channels of one of said beams and to at least one sidewall of a channel of another of said beams, said joint-forming member comprising an elongated flat base and a leg extending from said base transversely thereto, said base and said leg being of width to be received in said one channel; and said leg has at least two opposed sidewalls spaced apart a distance to be received in said other channel in face to face relationship with the sidewalls thereof.

5. A framework according to preceding claim 4 in which said leg is pivotally secured to said base of said joint-forming member to rotate about an axis transverse to said base.

6. A framework according to preceding claims 4 or 5 in which said leg pivotally secured to said base of said joint-forming member is rectangular in cross section, one dimension of said leg is less than the inside width of said side channels of said beams, and the other transverse dimension of said leg is greater than said inside width of said side channels and less than the inside width of said center channels of said beams.

* * * * *